US005663310A

United States Patent [19]
Shimoda et al.

[11] Patent Number: 5,663,310
[45] Date of Patent: Sep. 2, 1997

[54] CELLULOSE ACETATE SOLUTION AND PROCESS FOR THE PREPARATION OF THE SAME

[75] Inventors: Kazuhiro Shimoda; Masahiko Murayama; Hidekazu Yamazaki, all of Kanagawa; Tohru Shibata, Hyogo; Shu Shimamoto, Hyogo; Hiroyuki Takemoto, Hyogo; Naoto Habu, Hyogo, all of Japan

[73] Assignees: Fuji Photo Film Co., Ltd., Kanagawa; Daicel Chemical Industries, Ltd., Osaka, both of Japan

[21] Appl. No.: 582,344

[22] Filed: Jan. 19, 1996

[30] Foreign Application Priority Data

Jan. 19, 1995 [JP] Japan ................................ 7-006682
Feb. 23, 1995 [JP] Japan ................................ 7-034974

[51] Int. Cl.$^6$ ........................... C08B 3/06; C08B 3/22
[52] U.S. Cl. ................................. 536/69; 536/76
[58] Field of Search ........................... 536/69, 70, 71, 536/72, 73, 74, 75

[56] References Cited

PUBLICATIONS

J.M.G. Cowie et al., Report in Makromol., Chem., The Dissolution and Stability . . . vol. 143, pp. 105–114, 1971.
K. Kamide et al., Textile Machinery Society, Dry Spinning of Cellulose . . . vol. 34, pp. 57–61, 1981.

*Primary Examiner*—Nathan M. Nutter
*Attorney, Agent, or Firm*—Birch, Stewart, Kolasch & Birch, LLP

[57] ABSTRACT

A cellulose acetate solution has cellulose acetate in a solvent. The cellulose acetate has an average acetic acid content in the range of 58.0 to 62.5%. In the first embodiment of the invention, the solvent is a mixture of acetone and another organic solvent. The organic solvent is an ether having 3 to 12 carbon atoms, a ketone having 4 to 12 carbon atom, an ester having 3 to 12 carbon atoms, or an alcohol having 1 to 6 carbon atoms. In the second embodiment, the solvent is the ether, the ketone or the ester. Processes for the preparation of the solution and a cellulose acetate film are also disclosed.

17 Claims, 2 Drawing Sheets

CELLULOSE ACETATE SOLUTION AND PROCESS FOR THE PREPARATION OF THE SAME

FIELD OF THE INVENTION

The present invention relates to a cellulose acetate solution, a process for the preparation of the solution and a process for the preparation a cellulose acetate film.

BACKGROUND OF THE INVENTION

A cellulose acetate film is used in various photographic or optical elements because it has tough and enough flame retardant properties. The cellulose acetate film is a representative photogrpahic support. Further, the cellulose acetate film has an optical isotropy. Accordingly, the film is also used in a liquid crystal display device, which has recently extended its market. The cellulose acetate film is used as a protective film of a polarizing plate or a color filter in the liquid crystal display device.

The acetic acid content and the polymerization degree (which has a correlation with the viscosity) of cellulose acetate influence the mechanical strength and the durability of a film obtained from the cellulose acetate. The elasticity, folding endurance, dimensional stability and resistance to moisture and heat decrease with decreasing the acetic acid content and the polymerization degree. An acetic acid content of 58% or more (preferably 59% or more) is necessary to satisfy the required quality of the photogrpahic support or the optical film. The cellulose acetate having an acetic acid content of 58% or more is referred to as triacetyl cellulose (TAC). With respect to the polymerization degree, cellulose acetate preferably has a viscosity average degree of polymerization of not less than 270, and more preferably of not less than 290.

A cellulose acetate film is prepared according to a solvent cast method or a melt cast method. The solvent cast method comprises the steps of casting a solution of cellulose acetate in a solvent (that is called "dope") on a support, and evaporating the solvent to form a film. The melt cast method comprises the steps of casting molten cellulose acetate on a support under heating, and cooling it to form a film. The solvent cast method can form a highly flat film, compared with the melt cast method. Therefore, the solvent cast method is generally employed to give a cellulose acetate film.

The solvent cast method is described in various documents. The recent object of the method is to shorten the period of time between casting the dope on the support and peeling the formed film off the support. If the time is shortened, the productivity of the film formation is improved. For examples, Japanese Patent Publication No. 5(1993)-17844 discloses a process of casting a concentrated dope on a cooled drum to shorten the period of time between the casting step and the peeling step.

The solvent used in the solvent cast method must have functions not only of dissolving the cellulose acetate but also of forming an excellent film. In more detail, the viscosity and the polymer concentration of the solution (dope) should be appropriately adjusted to form a flat plane film having a uniform thickness. The dope also should have enough stability. Further, the dope should easily be set to gel. Furthermore, the formed film should easily be peeled off the support. The most appropriate solvent must be selected to satisfy these requirements. Moreover, the solvent should be so easily evaporated that the solvent scarcely can remain in the film.

Various organic solvents have been proposed as the solvents of cellulose acetate. However, only methylene chloride satisfies all of the above-mentioned requirements. Accordingly, solvents other than methylene chloride have not been practically used.

However, the use of hydrocarbon halides such as methylene chloride has recently been restricted severely to protect the global environmental conditions. Further, methylene chloride is apt to vaporize in the process for the preparation of the film, because it has a low boiling point (41° C.). Accordingly, methylene chloride may cause problems in the working environment. Therefore, the process is conducted under closed conditions. However, there is a technical limitation on sealing methylene chloride in a closed system. Accordingly, it is an urgent necessity to search for a new solvent for the cellulose acetate, namely replacement of methylene chloride.

By the way, acetone is a widely used organic solvent. Acetone has an appropriate boiling point (56° C.). The process of evaporating acetone does not need a large thermal energy. Further, acetone has few problems on the human body and the global environmental conditions, compared with the organic chloride solvents.

However, cellulose acetate has a poor solubility in acetone. Cellulose acetate having a degree of substitution of not more than 2.70 (acetic acid content: 58.8%) is slightly soluble in acetone. The solubility decreases with increasing the substitution degree. Cellulose acetate having the substitution degree of not less than 2.80 (acetic acid content: 60.1%) is not soluble in acetone, and is merely swelled in acetone.

J. M. G. Cowie et al. report in Makromol., Chem., 143 (1971) 105–114, that cellulose acetate having a substitution degree in the range of 2.70 (acetic acid content: 60.1%) to 2.80 (acetic acid content: 61.3%) is dissolved in acetone by a specific process. The process comprises the steps of cooling the cellulose acetate in acetone to a temperature of −80° to −70° C., and warming it to obtain 0.5 to 5 wt. % solution of the cellulose acetate in acetone. The method of cooling the mixture of cellulose acetate in acetone to obtain a solution is hereinafter referred to as a cooling dissolution method. The dilute (0.5 to 5 wt. %) solution reported in J. M. G. Cowie et al. is not appropriate for preparation of a cellulose acetate film. The dope for the preparation of the film requires a cellulose acetate concentration in the range of 10 to 30 wt. %.

The solution of cellulose acetate in acetone is also reported by K. Kamide et al., Textile Machinery Society, Vol. 34, 57–61 (1981). The report (written in Japanese) is entitled "Dry spinning process using acetone solution of triacetyl cellulose." In the report, the cooling dissolution method is applied to the art of fiber spinning. The experiments shown in the report examine the mechanical strength, the dyeing property and the sectioned shape of the fiber obtained by the cooling dissolution method. In the report, 10 to 25 wt. % solution of cellulose acetate is used to form a fiber.

SUMMARY OF THE INVENTION

According to the cooling dissolution method, cellulose acetate can be dissolved in acetone to obtain a solution. However, the obtained solution has a problem about stability.

The stability of the obtained dope is an important factor in the preparation of the film. Precipitation of insoluble must be avoided while sending the dope through a tube. Coagulation of the dope must also be avoided while the use of apparatus is stopped for inspection.

FIG. 1 is a graph showing the states of the dope of cellulose acetate (acetic acid content: 60.9%, viscosity average degree of polymerization: 299) in acetone prepared by the cooling dissolution method. The abscissa means the concentration of cellulose acetate in the dope. The ordinate means the temperature at which the dope is stored. As is shown in FIG. 1, there are two phase separation areas within the temperature of −10° to 30° C., at which the dope is usually stored. The phase separation area at the high temperature is of an LCST type, and the area at the low temperature is of a UCST type. The temperature of the uniform phase area shown in FIG. 1 should be kept to store the dope at a stable state. At the temperature without the uniform phase area, the dope forms a milky white solid because of phase separation.

An object of the present invention is to provide a cellulose acetate solution in which cellulose acetate is dissolved in an organic solvent in a stable state.

Another object of the invention is to prepare a stable cellulose acetate solution according to a cooling dissolution method.

A further object of the invention is to prepare an excellent cellulose acetate film according to the cooling dissolution method.

The first embodiment of the present invention provides a cellulose acetate solution which comprises cellulose acetate having an average acetic acid content in the range of 58.0 to 62.5% in a solvent, wherein the solvent is a mixture of acetone and another organic solvent which is selected from the group consisting of an ether having 3 to 12 carbon atoms, a ketone having 4 to 12 carbon atom, an ester having 3 to 12 carbon atoms and an alcohol having 1 to 6 carbon atoms.

The cellulose acetate solution is preferably prepared by a process which comprises the steps of:

cooling a mixture of cellulose acetate and a solvent to a temperature of −100° to −10° C., said cellulose acetate having an average acetic acid content in the range of 58.0 to 62.5%, and said solvent being a mixture of acetone and another organic solvent which is selected from the group consisting of an ether having 3 to 12 carbon atoms, a ketone having 4 to 12 carbon atom, an ester having 3 to 12 carbon atoms and an alcohol having 1 to 6 carbon atoms; and warming the cooled mixture to a temperature of 0° to 50° C. to dissolve the cellulose acetate in the solvent.

A cellulose acetate film can be prepared by casting the obtained solution on a support; and evaporating the solvent.

The second embodiment of the invention provides a cellulose acetate solution which comprises cellulose acetate having an average acetic acid content in the range of 58.0 to 62.5% in a solvent, wherein the solvent is selected from the group consisting of an ether having 3 to 12 carbon atoms, a ketone having 4 to 12 carbon atom and an ester having 3 to 12 carbon atoms.

The cellulose acetate solution is preferably prepared by a process which comprises the steps of:

cooling a mixture of cellulose acetate and a solvent to a temperature of −100° to −10° C., said cellulose acetate having an average acetic acid content in the range of 58.0 to 62.5%, and said solvent being selected from the group consisting of an ether having 3 to 12 carbon atoms, a ketone having 4 to 12 carbon atom and an ester having 3 to 12 carbon atoms; and warming the cooled mixture to a temperature of 0° to 50° C. to dissolve the cellulose acetate in the solvent.

A cellulose acetate film can also be prepared by casting the obtained solution on a support; and evaporating the solvent.

DETAILED DESCRIPTION OF THE INVENTION

[Cellulose Acetate]

Figure 1:
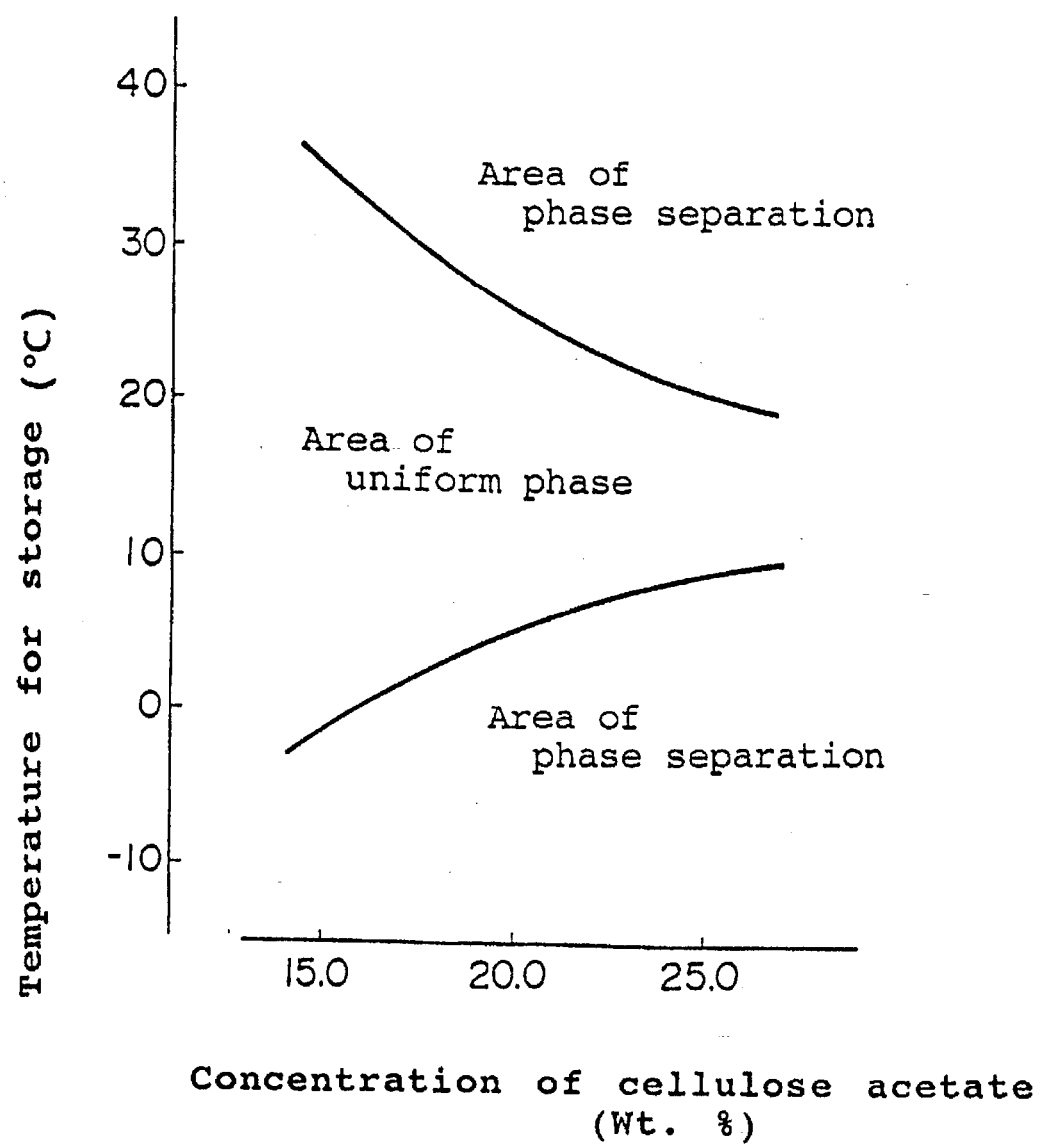
FIG. 1 is a graph showing the states of the dope of cellulose acetate in acetone prepared by the cooling dissolution method.

The cellulose acetate used in the present invention has an average acetic acid content in the range of 58.0 to 62.5%. The acetic acid content means a percent weight ratio of acetic acid moiety combined to cellulose. The acetic acid content is measured and calculated according to ASTM, D-817-91 (Testing methods for cellulose acetate etc.).

The range of 58.0 to 62.5% is necessary to satisfy the required quality of a photographic support or an optical film. Further, cellulose acetate having an average acetic acid content of not more than 58.0% can be dissolved in acetone without use of the cooling dissolution method of the present invention.

Cellulose acetate can be prepared from cotton linter or wood pulp. Cotton linter can be mixed with wood pulp. Wood pulp is rather inexpensive. However, the formed film can easily be peeled off the support when using the cotton linter only or a mixture of the linter and the wood pulp. Further, the film prepared from the cotton linter has a rather smooth surface even if the film is prepared within a short period of time.

Cellulose acetate is usually prepared by acetylation of cellulose using acetic acid, acetic anhydride and sulfuric acid. A methylene chloride method or a fiber acetylation method is adopted on an industrial scale. According to the methylene chloride method, acetylation is conducted in a methylene chloride solution. According to the fiber acetylation method, cellulose fiber is acetylated in a non-solvent (e.g., benzene, toluene) of cellulose.

Cellulose acetate preferably has a viscosity average degree of polymerization (DP) in the range of 250 to 400. The polymerization degree more preferably is not less than 290. If the polymerization degree is less than 250, the strength of the obtained film is poor. The viscosity average degree of polymerization is calculated from the inherent viscosity of cellulose acetate [$\eta$] according to the formula (1). The viscosity can be measured by an Ostwald viscometer.

$$DP = [\eta]/Km \qquad (1)$$

wherein [$\eta$] means the inherent viscosity of cellulose acetate; and Km is the constant of $6 \times 10^{-4}$.

In the case that the viscosity average degree of polymerization (DP) is not less than 290, cellulose acetate preferably has a relation of the formula (2) between the viscosity average degree of polymerization (DP) and a concentrated solution viscosity ($\eta$):

$$2.814 \times \ln(DP) - 11.753 < \ln(\eta) < 6.29 \times \ln(DP) - 31.469 \qquad (2)$$

wherein DP means the value of a viscosity average degree of polymerization, which is not less than 290; and $\eta$ is the time (in terms of second) taken for a ball to pass between the standard lines measured according to a falling ball method.

The formula (2) is obtained by plotting the viscosity average degree of polymerization and the concentrated solution viscosity, which are obtained by the experimental results. The concentrated solution viscosity of cellulose acetate having a viscosity average degree of not less than 290 increases usually according to an exponential equation with increase of the degree. On the other hand, the formula (2) defines that the concentrated solution viscosity increases according to a primary equation with increasing the degree. Accordingly, the increase of the concentrated solution viscosity is preferably restricted to satisfy the formula (2) where cellulose acetate has a high viscosity average degree of polymerization.

Cellulose acetate preferably has a narrow molecular weight distribution in terms of Mw/Mn (wherein Mw means the weight average molecular weight, and Mn means the number average molecular weight). Mw and Mn can be measured by a gel permeation chromatography. The value of Mw/Mn is preferably in the range of 1.0 to 1.7, more preferably in the range of 1.3 to 1.65, and most preferably in the range of 1.4 to 1.6. In the case that Mw/Mn is more than 1.7, the viscosity of the dope so increases that the flatness of the film lowers. On the other hand, it is difficult to prepare cellulose acetate having a value of Mw/Mn in the range of 1.0 to 1.4. Even if such cellulose acetate were obtained, the molecular weight would be extremely small. If a film is formed from such cellulose acetate, the mechanical properties of the film are inferior because of the small molecular weight.

Cellulose acetate preferably has a small value of a crystallization exotherm. The small crystallization exotherm means that the degree of crystallization is low. The crystallization exotherm ($\Delta Hc$) is preferably in the range of 5 to 17 J/g, more preferably in the range of 6 to 16 J/g, and most preferably in the range of 10 to 16 J/g. If the crystallization exotherm is more than 17 J/g, fine crystals are present in the formed film. The fine crystals decrease the solubility of cellulose acetate in acetone or other organic solvents. Further, the obtained solution is not so stable that the fine crystals tend to be formed again. Furthermore, the crystals degrade the handling and the optical properties of the film. If the crystallization exotherm is less than 5 J/g, the mechanical strength of the obtained film is insufficient. Further, it requires a relatively long period of time to set the dope to gel where the crystallization exotherm is small.

The low molecular weight fraction is preferably removed from cellulose acetate to satisfy the relation between the viscosity average degree of polymerization (DP) and the concentrated solution viscosity ($\eta$), the molecular weight distribution (Mw/Mn) and the crystallization exotherm ($\Delta Hc$).

If the low molecular weight fraction is sufficiently removed, the average molecular weight (polymerization degree) increases while the viscosity is relatively low compared with usual cellulose acetate. Accordingly, it is easy to satisfy the relation between DP and $\eta$. Further, the molecular weight distribution is made uniform by removing the low molecular weight fraction. The low molecular weight fraction is easily crystallized. Accordingly, the crystallization exotherm can be decreased by removing the lower molecular weight fraction.

The amount of the low molecular weight fraction is preferably not more than 10 wt. %. The cellulose acetate having such a small amount of the fraction can be obtained by removing the fraction from conventional or commercially available cellulose acetate.

The low molecular weight fraction can be removed by washing cellulose acetate with an organic solvent. Examples of the organic solvents include ketones (e.g., acetone), acetic esters (e.g., methyl acetate) and cellosolves (e.g., methyl cellosolve). Ketones are preferred, and acetone is particularly preferred.

When conventional cellulose acetate is once washed with an organic solvent, a low molecular weight fraction is removed. The amount of the fraction is usually in the range of 10 to 15 wt. %. When the cellulose acetate is washed again, the amount of the remaining low molecular weight fraction (which is soluble in acetone at 25° C.) is usually made to not more than 10 wt. %. The low molecular weight fraction is easily removed if the amount of the fraction soluble in acetone is not more than 10 wt. %. Accordingly, the fraction can be sufficiently removed by only one washing process. The amount of the low molecular weight fraction which is soluble in acetone at 25° C. is more preferably not more than 5 wt. %

Before washing cellulose acetate, cellulose acetate particles are preferably ground and filtered to adjust the particle size. In more detail, the particle size is so adjusted that at least 70% of the particles pass through a sieve of 20 mesh.

The washing process can be conducted by a solvent cycling method, such as Soxhlet extraction method. Further, the process can be conducted by stirring cellulose acetate with a solvent in a conventional tank, and then separating the acetate from the solvent. At the first washing stage, the solvent tends to become viscous because a large amount of the low molecular weight fraction (10 to 15% of cellulose) is usually dissolved in the solvent. Therefore, the ratio of the cellulose acetate to the solvent is preferably not more than 10 wt. % to conduct the washing process.

Cellulose acetate having a small amount of low molecular weight fraction can be produced. At the acetylation reaction, the amount of sulfuric acid (catalyst) preferably is in the range of 10 to 15 weight parts based on 100 weight parts of cellulose acetate to decrease the amount of the fraction. If the amount of the sulfuric acid catalyst is adjusted within the above-mentioned range (relatively large amount), the produced cellulose acetate has a relatively uniform molecular weight distribution.

[Solvent of the First Embodiment]

In the first embodiment of the invention, the solvent is a mixture of acetone and another organic solvent which is selected from the group consisting of an ether having 3 to 12 carbon atoms, a ketone having 4 to 12 carbon atom, an ester having 3 to 12 carbon atoms, and an alcohol having 1 to 6 carbon atoms.

The solvent preferably contains almost no hydrocarbon halide such as methylene chloride. If hydrocarbon halide is incorporated into the solvent, the amount of hydrocarbon halide should be not more than 50 wt. %, preferably not more than 30 wt. %, more preferably not more than 20 wt. %, further preferably not more than 10 wt. %, furthermore preferably not more than 5 wt. %, and most preferably not more than 2 wt. % based on the amount of the solvent.

The ether, ketone, ester and alcohol can have a cyclic structure. Examples of the solvents include a compound having two or more kinds of functional groups of the ether, ketone, ester and alcohol (namely, —O—, —CO—, —COO— and —OH). In the case that the solvent has two or more kinds of functional groups, the number of carbon atoms is defined as a compound having one functional group, which is optionally selected from the groups of the solvent.

Examples of the ethers having 3 to 12 carbon atoms include diisopropyl ether, dimethoxymethane, 1,4-dioxane, 1,3-dioxolane, tetrahydrofuran, anisole and phenetol.

Examples of the ketones having 4 to 12 carbon atom include methyl ethyl ketone, diethyl ketone, cyclohexanone and methylcyclohexanone.

Examples of the esters having 3 to 12 carbon atoms include ethyl formate, propyl formate, pentyl formate, methyl acetate, ethyl acetate and pentyl acetate.

Examples of the alcohols having 1 to 6 carbon atoms include methanol, ethanol, propanol, isopropanol, 1-butanol, t-butanol, 2-methyl-2-butanol and cyclohexanol.

Examples of the compounds having two or more kinds of functional groups include 2-ethoxyethyl acetate, 2-methoxyethanol and 2-butoxyethanol.

The solvent preferably has a solubility parameter in the range of 19.0 to 20.0 $MPa^{1/2}$. The solubility parameter is defined by the following formula (3).

$$\delta=(E/v)^{1/2} \tag{3}$$

wherein $\delta$ is the solubility parameter ($MPa^{1/2}$); E is the energy of evaporation (J per mol); and v is the molar volume (ml/mol at 20° C.).

Examples of the solvents having a solubility parameter in the range of 19.0 to 20.0 $MPa^{1/2}$ include methyl acetate (19.6 $MPa^{1/2}$), cyclohexanone (19.7 $MPa^{1/2}$), ethyl formate (19.4 $MPa^{1/2}$), and 2-methyl-2-butanol (19.0 $MPa^{1/2}$). Methyl acetate is particularly preferred.

The amount of acetone in the mixture is preferably 10 to 99.5 wt. %, more preferably 20 to 95 wt. %, further preferably 40 to 90 wt. %, and most preferably 50 to 80 wt. %.

[Solvent of the Second Embodiment]

In the second embodiment of the invention, the solvent is selected from the group consisting of an ether having 3 to 12 carbon atoms, a ketone having 4 to 12 carbon atom, and an ester having 3 to 12 carbon atoms.

The solvent preferably contains almost no hydrocarbon halide such as methylene chloride. If hydrocarbon halide is incorporated into the solvent, the amount of hydrocarbon halide should be not more than 50 wt. %, preferably not more than 30 wt. %, more preferably not more than 20 wt. %, further preferably not more than 10 wt. %, furthermore preferably not more than 5 wt. %, and most preferably not more than 2 wt. % based on the amount of the solvent.

The definitions and examples of the ether, ketone and ester are described in the first embodiment.

Cellulose acetate having an average acetic acid content in the range of 58.0 to 62.5% (preferably further having a viscosity average degree of polymerization in the range of 250 to 400) is preferably swelled in the solvent at room temperature, but is preferably not dissolved in the solvent. The swell is a phenomenon that a substance adsorbs a liquid to increase its volume. The phenomenon is widely observed where the substance is a polymer. A substance is swelled in a liquid to some extent. If the substances are swelled limitlessly in a liquid, they are finally dissolved in the liquid. In the present invention, cellulose acetate is preferably limitedly swelled in the solvent at room temperature.

A dissolving power of a solvent determines whether a polymer is dissolved or swelled in the solvent. The dissolving power depends on the change of a free energy when the polymer is mixed with a solvent, in more detail a differential diluted free energy of a molecule ($\Delta F$). The $\Delta F$ corresponds to the change of free energy when 1 mol of a solvent is added to a limitless amount of a solution having a certain concentration. The $\Delta F$ is defined in the following formula (4):

$$\Delta F=RT[ln(1-v)+(1-1/\phi)v+\chi v^2] \tag{4}$$

wherein R is the gas constant; T is the absolute temperature; v is the volume fraction of the polymer; $\phi$ is the volume ratio of the polymer molecule to the solvent molecule; and $\chi$ is the constant of interaction.

The value of $\chi$ quantitatively represents the dissolving power. A good solvent has a small value of $\chi$. Further, the value of $\chi$ has a correlation with a cohesive energy density, which represents the strength of the intermolecular force. The square root of the value of $\chi$ means the solubility parameter. The solubility parameter is described in the formula (3) of the first embodiment.

In the second embodiment, methyl acetate is particularly preferred. Methyl acetate shows a high dissolving power to cellulose acetate, compared with acetone. Accordingly, cellulose acetate can easily be dissolved in methyl acetate at a relatively high cooling temperature (−30° to −20° C.). On the other hand, acetone requires a low cooling temperature (−50° to −30° C.). Therefore, a cooling dissolution method using methyl acetate can be conducted in a relatively simple cooling apparatus.

Further, methyl acetate has a large solvation effect on cellulose acetate after the cooling dissolution method is conducted. Accordingly, the methyl acetate solution has a high stability, compared with the acetone solution. The viscosity of the methyl acetate solution is relatively high. However, the viscosity can be adjusted by mixing another organic solvent with methyl acetate.

Other good or poor solvents of cellulose acetate can be added to the solvent of the present invention.

An example of the good solvent is nitromethane. The cooling temperature of the cooling dissolution method can be increased by adding the good solvent.

The poor solvent preferably has a boiling point of not lower than 60° C. Examples of the poor solvents are alcohols having 1 to 6 carbon atoms (e.g., methanol, ethanol, propanol, isopropanol, 1-butanol, t-butanol, 2-methyl-2-butanol, cyclohexanol). The viscosity of the solution can be adjusted by adding the poor solvent. The poor solvent has another function of shortening the time for drying the film. The poor solvent has a further function of increasing the gelation temperature to improve the strength of the gel. Therefore, the film can easily be peeled off the support by using the poor solvent to shorten the time for the preparation of the film.

In the case that the solvent of the present invention is used in combination with the other solvent, the solvent of the invention in the mixture is in an amount of preferably 10 to 99.5 wt. %, more preferably 20 to 99 wt. %, further preferably 40 to 98.5 wt. %, and most preferably 60 to 98 wt. %.

[Formation of Dope (Cooling Dissolution Method)]

In the present invention, cellulose acetate is dissolved in the solvent according to the cooling dissolution method to obtain a solution (dope).

At the first stage of the dope formation, cellulose acetate is gradually added to the solvent while stirring at room temperature. Cellulose acetate is swelled with the solvent, but is not dissolved at this stage. The amount of cellulose acetate is in the range of 10 to 40 wt. %, based on the amount of the mixture. The amount is preferably in the range of 10 to 30 wt. %. The other optional additives (described below) may be added to the solvent.

At the next stage, the mixture is cooled to a temperature of −100° to −10° C., preferably −80° to −10° C., more preferably −50° to −20° C., and most preferably −50° to −30° C. The mixture can be cooled in a dry ice/methanol bath (−75° C.) or in a cooled diethylene glycol solution (−30° to −20° C.). At the cooling stage, the mixture of cellulose acetate and the solvent generally solidify.

Subsequently, the mixture is warmed to a temperature of 0° to 50° C. to dissolve the cellulose acetate in the solvent. The mixture can be warmed by keeping it at room temperature. The mixture can also be warmed on a bath. Thus a dope is formed as a uniform solution. If cellulose acetate is not sufficiently dissolved, the cooling and warming steps can be repeated. The dope is observed with eyes to determine whether cellulose acetate is sufficiently dissolved or not.

A sealed vessel is preferably used in the cooling dissolution method to prevent contamination of water, which is caused by dew condensation at the cooling step. The time for the cooling and warming steps can be shortened by conducting the cooling step under a high pressure and conducting the warming step under a low pressure. A pressure vessel is preferably used under a high or low pressure.

In the case that cellulose acetate (acetic acid content: 60.9%, viscosity average degree of polymerization: 299) is dissolved in methyl acetate by a cooling dissolution method to form 20 wt. % solution, the solution has a pseudo sol-gel phase transition point at about 33° C., which is measured by a differential scanning calorimeter (DSC). Under the transition point, the solution forms a uniform gel. Therefore, the solution should be stored at a temperature higher than the transition point, preferably at a temperature about 10° C. higher than the point. The pseudo sol-gel phase transition point depends on the average acetic acid content of cellulose acetate, the viscosity average degree of polymerization, the concentration of the dope and the nature of the solvent.

[Preparation of Film]

The dope is cast on a support, and the solvent is evaporated to form a film. Before casting the dope, the concentration of the dope is so adjusted that the solid content of the dope is in the range of 18 to 35 wt. %. The surface of the support is preferably polished to give a mirror plane. A drum or a band is used as the support. The casting and drying stages of the solvent cast methods are described in U.S. Pat. Nos. 2,336,310, 2,367,603, 2,492,078, 2,492,977, 2,492, 978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The support preferably has a surface temperature of not higher than 10° C. when the dope is cast on the support. After casting the dope, the dope is preferably dried with air for at least 2 seconds. The formed film is peeled off the support, and the film can be further dried with air to remove the solvent remaining in the film. The temperature of the air can be gradually elevated from 100° to 160° C. The above-mentioned method is described in Japanese Patent Publication No. 5(1993)-17844. According to the method, the time for casting and peeling steps can be shortened. The method requires that the dope be set to gel at the surface temperature of the support. The dope formed according to the present invention satisfies the requirement.

The cellulose acetate film has a thickness preferably in the range of 5 to 500 μm, more preferably in the range of 20 to 200 μm, and most preferably in the range of 60 to 120 μm.

[Other Additives]

A plasticizer can be added to the cellulose acetate film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP) and diethylhexyl phthalate (DEHP). Examples of the citric esters include —O-acetyltriethyl citrate (OACTE) and —O-acetyltributyl citrate (OACTB). Examples of the carboxylic esters include phthalic esters and citric esters. Examples of the other carboxylic esters include butyl oleate, methylacetyl ricinoleate, di-butyl sebacate and various trimellitic esters. Phthalic ester plasticizers (DMP, DEP, DBP, DOP, DEHP) are preferred. DEP is particularly preferred.

Further, a compound represented by the formula (I), (II) or (III) can be added to the film:

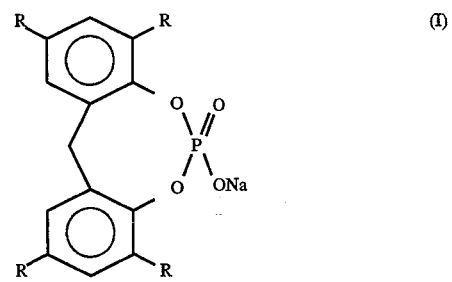

(I)

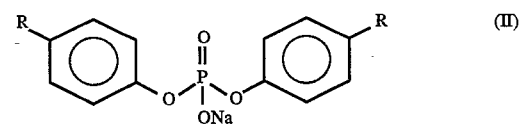

(II)

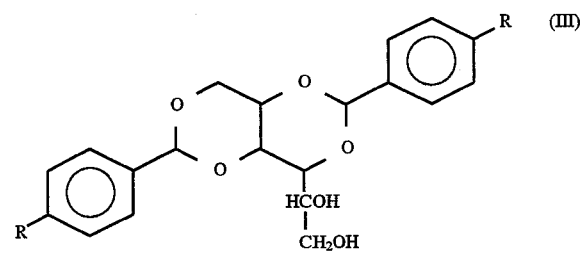

(III)

wherein R is an alkyl group having 1 to 4 carbon atoms.

The compounds of the formulas (I) to (III) are known as crystal nucleus forming agents (nucleus agents). The agents are used to improve optical, mechanical, thermal or molding characteristics of a crystalline polymer (e.g., polypropylene) when the polymer is melt and molded.

In the present invention, the compounds of the formulas (I) to (III) are not used as the crystal nucleus forming agents, but are used to increase the gel point of the dope. The compounds have an affinity to cellulose acetate because they have amphiphatic chemical structures. Further, the compounds have a function of aggregate themselves. Accordingly, the compounds accelerate the aggregation of cellulose acetate to increase the gel point of the dope.

The compounds of the formulas (I) to (III) have another function of decreasing the viscosity of the dope. The compounds inhibit solvation between the solvent and hydroxyl of cellulose acetate to restrict diffusion of the polymer.

Examples of the compounds of the formulas (I) to (III) include 2,2'-methylenebis(4,6-di-t-butylphenyl) sodium phosphate (Adecastab NA-11, product of Asahi Electro-Chemical Co., Ltd.), bis(4-t-butylphenyl) sodium phosphate (Adecastab NA-10, product of Asahi Electro-Chemical Co., Ltd.), bis(p-methylbenzilidene)sorbitol (Gelol MD, product of New Japan Rika Co., Ltd.) and bis(p-ethylvindilidene)-sorbitol (NC-4, product of Mitsui Toatsu Chemicals, Inc.).

Deterioration inhibitors (e.g., peroxide decomposer, radical inhibitor, metal inactivating agent, oxygen scavenger) or ultraviolet inhibitors can be incorporated into the cellulose acetate film. The deterioration inhibitors are described in Japanese Patent Provisional Publication No. 5(1993)-197073. The ultraviolet inhibitors are described in Japanese Patent Provisional Publication No. 7(1995)-11056.

In the Examples, the chemical and physical characteristics of the cellulose acetate, the dope and the film are measured and calculated in the following manner.

(1) Acetic acid content (%) of cellulose acetate

The acetic acid content was measured according to a saponification method. Cellulose acetate was dried and weighed exactly, and was dissolved in a mixture of acetone and dimethylsulfoxide (volume ratio: 4:1). A predetermined amount of 1N sodium hydroxide solution was added to the solution. The mixture was saponified at 25° C. for 2 hours. Phenolphthalein (indicator) was added to the solution. Excess sodium hydroxide was tittered with 1N sulfuric acid (concentration factor: F). Further, a blank test was conducted in the same manner. The acetic acid content was calculated according to the following formula:

$$\text{Acetic acid content } (\%) = (6.005 \times (B-A) \times F)/W$$

wherein A is the amount of 1N sulfuric acid (ml) required for titration of the sample; B is the amount of 1N sulfuric acid (ml) required for the blank test, F is the factor of 1N sulfuric acid; and W is the weight of the sample.

(2) Average molecular weight and molecular weight distribution of cellulose acetate The molecular weight was measured by using a high speed liquid chromatography system (GPC-LALLS). In the system, a detector for refractive index and light scattering was attached to a gel permeation column. The conditions for measurement are shown below.

Solvent: methylene chloride

Column: GMH×1 (Toso Ltd.)

Concentration of sample: 0.1 w./v. %

Flow rate: 1 mn/min

Amount of injected sample: 300 μl

Standard sample: Polymethyl methacrylate (Mw: 188,200)

Temperature: 23° C.

(3) Viscosity average degree of polymerization of cellulose acetate (DP)

About 0.2 g of completely dried cellulose acetate was weighed exactly, and dissolved in 100 ml of a mixture of methylene chloride and ethanol (weight ratio: 9:1). The solution was examined by an Ostwald viscometer. The degree of polymerization was calculated by the following formulas:

$$\eta_{rel} = T/T_0$$

$$[\eta] = (\ln \eta_{rel})/C$$

$$DP = [\eta]/Km$$

wherein T is the time (second) taken for the sample to pass between standard lines; $T_0$ is the time (second) taken for the solvent only; C is the concentration (g/l); and Km is the constant of $6 \times 10^{-4}$.

(4) Concentrated solution viscosity (η) of cellulose acetate

Cellulose acetate was dissolved in a mixture of methylene chloride and methanol (weight ratio: 8:2) to prepare 15 wt. % solution. The solution was injected into a viscosity tube having the internal diameter of 2.6 cm. The sample was conditioned to 25° C. A hard ball (diameter: 3.15 mm, weight: 0.135 g) was dropped into the solution. The viscosity was measured as the time (second) taken for a ball to pass between two standard lines (distance: 10 cm).

(5) Crystallization exotherm (ΔHc) of cellulose acetate

Cellulose acetate was dissolved in a mixture of methylene chloride and ethanol (weight ratio: 9:1) to prepare 15 wt. % dope. The dope was filtered over a non-woven fabric under pressure, and was cast on a smooth glass plate using a bar coater. The formed film was dried with air for one day, and peeled off the glass plate. The film was further dried under vacuum at 80° C. for 4 hours. In a standard aluminum pan, 10 mg of the obtained film sample was placed. The pan was further placed on a sample table of a thermal compensation type differential scanning calorimeter (DSC). The sample was left for a short time at the temperature of the melting point. The melted sample was cooled to room temperature at the cooling rate of 4° C. per 1 minute to crystallize the sample.

The crystallization exotherm (ΔHc) was obtained from the area of the exotherm peak in the measured DSC curve. The DSC measurement was conducted in an atmosphere of nitrogen. The temperature was calibrated at the two points of In (melting point: 156.60° C.) and Sn (melting point: 231.88° C.). The calorie was calibrated at the point of In (heat of melt: 28.45 J/g). The crystallization temperature was analyzed according to JIS-K-7121 (1987). The heat of crystallization was analyzed according to JIS-K-7122 (1987).

(6) Ratio of acetone extracted fraction (%) of cellulose acetate

The weight of cellulose acetate (A) was measured. The cellulose acetate was stirred in acetone (amount: 10×A) at room temperature for 30 minutes. The mixture was filtered under pressure. The filtrate was dried to measure the weight of the solid content (B). The ratio of the fraction extracted with acetone was calculated according to the following formula:

$$\text{Acetone extracted fraction } (\%) = (B/A) \times 100$$

(7) Viscosity and gelation of dope

The gelation was observed using a viscometer (HAAKE). The turning point of the coefficient A in the following Andrade's equation is measured. The gelation was determined from the turning point and the attained viscosity.

Rotor: sv-DIN

Shearing rate: 0.1 (1/sec)

Cooling rate: 0.5° C./min  η=Aexp(B/T)

wherein T is the temperature at the measurement; and each of A and B is a constant determined by the conditions of the polymer. The gelation is determined whether the coefficient A has a turning point (shown in a graph of viscosity and temperature) or not.

(8) Equilibrium water content of film

A film was placed at 25° C. and 60% RH for 24 hours. The amount of water of equilibrium water contained in the sample was measured by a Karl-Fischer method. The amount of water (g) was divided by the amount of the sample to calculate the equilibrium water content.

The measurement was conducted by using a water content analyzer (CA-03, product of Mitsubishi Chemical Co., Ltd.), a drying device (VA-05, product of Mitsubishi Chemical Co., Ltd.) and Karl-Fischer agents (AKS and CKS, product of Mitsubishi Chemical Co., Ltd.).

(9) Tensile test of film

A sample (length: 100 mm, width: 10 mm) was tested according to ISO-1184-1983. The modulus of elasticity and the breaking extension were measured under conditions that the first sample length was 50 mm and the extending rate was 20 mm/min.

(10) Tear test of film

A sample (50 mm×64 mm) was tested according to ISO-6383/2-1983 to determine the weight for tearing the sample.

(11) Folding endurance test of film

A sample of 120 mm was tested according to ISO-8776/2-1988 to determine the folding times for breaking the sample.

(12) Resistance to moisture-heat of film

In a glass bottle of 15 ml, 1 g of a folded sample was placed. The sample was conditioned at 90° C. and the relative humidity of 100%. The bottle was sealed and placed at 90° C. for 200 hours. The sample was observed and classified into the following two grades:

A: No change was observed.

B: Smell of decomposition or a change of shape caused by decomposition was noted.

(13) Retardation (Re) of film

The front retardation was measured by an ellipsometer (AEP-100, product of Shimadzu Seisakusho, Ltd.). The wavelength was 632.8 nm. The measurement was conducted in the direction perpendicular to the surface of the film.

(14) Haze of film

Haze was measured by a haze meter (1001DP type, product of Nippon Denshoku Co., Ltd.)

(15) $\ln(\eta)$ of cellulose acetate $\ln(\eta)$ was experimentally measured from the results of the viscosity of (4).

(16) Preferred lower limit of $\ln(\eta)$

(17) Preferred upper limit of $\ln(\eta)$

The values (16) and (17) were determined from the degree of polymerization (3) and the formula (2), which defines the relation between the degree of polymerization and the concentrated solution viscosity.

(18) Peeling characteristics of film

The dope was cast on a support at −5° C. to form a film. The film was peeled off the support. The peeling characteristics are evaluated as two grades.

A: The film was peeled within 20 seconds after casting.

B: The film was not completely peeled even when 60 seconds or more time lapses after casting.

(19) Stability of solution 83 weight parts of a solvent and 17 weight parts of cellulose acetate were mixed. The mixture was stirred at room temperature (23° C.) for 3 hours. The obtained solution or slurry was left and observed at room temperature, and was evaluated as three grades.

A: After 10 days, the solution is in the clear and uniform state. This solution shows an excellent solubility and stability.

B: Immediately after stirring, the solution is in the clear and uniform state. However, after one day, a phase separation is observed.

C: Immediately after stirring, the mixture forms a slurry.

(20) Casting bead and flatness of film after drying

The casing bead after casting solution on a support and the flatness of the film after drying were observed and evaluated into two grades.

A: The surface of the casting bead is smooth, and the film after drying is flat.

B: The casting bead contains aggregation of particles or a crack, and the film after drying also contains the aggregation, the crack or a wrinkle on the surface.

EXAMPLE 1

At room temperature, 100 weight parts of cellulose acetate (average acetic acid content: 60.9%, viscosity average degree of polymerization: 299) were mixed with 380 weight parts of acetone, 10 weight parts of 1-butanol and 10 weight parts of diethyl phthalate (DEP, plasticizer). The amount of cellulose acetate in the mixture was 20 wt. %. Cellulose acetate was not dissolved, but was swelled in the mixture of acetone and 1-butanol at room temperature. The swelled mixture was in the form of slurry.

The swelled mixture was placed in a jacketed vessel. The mixture was slowly stirred while pouring a mixture of water and ethylene glycol (cooling medium) into the outer jacket. Thus, the mixture placed in the inner vessel was cooled to −30° C. The mixture was uniformly cooled to complete gelation (30 minutes).

The cooling medium in the outer jacket was removed from the vessel, and warmed water was poured into the jacket. After the mixture was melted to some extent, the mixture was were stirred. Thus, the mixture was warmed to room temperature for 30 minutes.

The cooling and warming steps were repeated again.

The obtained dope was observed. Cellulose acetate was completely dissolved in the solvent to obtain a uniform dope.

Gelation of the dope was determined by the method (7). As a result, gelation was observed at a low temperature.

The dope was cast on a band using a band casting machine (effective length: 6 m). The dry thickness of the formed film was 100 μm. The temperature of the band was 0° C. The film was dried with air for 2 seconds, and peeled off the band. The film was further gradually dried at 100° C. for 3 minutes, at 130° C. for 5 minutes and at 160° C. for 5 minutes to evaporate the remaining solvent, while fixing the end of the film. Thus a cellulose acetate film was prepared.

EXAMPLE 2

A dope was prepared in the same manner as in Example 1, except that 100 weight parts of cellulose acetate were mixed with 380 weight parts of acetone, 10 weight parts of 1-butanol and 10 weight parts of acetyltriethyl citrate (OACTE, plasticizer).

The obtained dope was observed. Cellulose acetate was completely dissolved in the solvent to obtain a uniform dope. Further, gelation was observed at a low temperature.

The dope was cast and dried in the same manner as in Example 1 to prepare a cellulose acetate film.

EXAMPLE 3

A dope was prepared in the same manner as in Example 1, except that 100 weight parts of cellulose acetate were mixed with 370 weight parts of acetone, 10 weight parts of 2-methyl-2-butanol and 10 weight parts of acetyltriethyl citrate (OACTE, plasticizer).

The obtained dope was observed. Cellulose acetate was completely dissolved in the solvent to obtain a uniform dope. Further, gelation was observed at a low temperature.

The dope was cast and dried in the same manner as in Example 1 to prepare a cellulose acetate film.

EXAMPLE 4

A dope was prepared in the same manner as in Example 1, except that 100 weight parts of cellulose acetate were mixed with 250 weight parts of acetone and 50 weight parts of methyl acetate.

The obtained dope was observed. Cellulose acetate was completely dissolved in the solvent to obtain a uniform dope. Further, gelation was observed at a low temperature.

The dope was cast and dried in the same manner as in Example 1 to prepare a cellulose acetate film.

EXAMPLE 5

A dope was prepared in the same manner as in Example 1, except that 100 weight parts of cellulose acetate were mixed with 300 weight parts of acetone and 50 weight parts of cyclohexanone and that a mixture of methanol and dry ice was used as the cooling medium.

The obtained dope was observed. Cellulose acetate was completely dissolved in the solvent to obtain a uniform dope. Further, gelation was observed at a low temperature.

The dope was cast and dried in the same manner as in Example 1 to prepare a cellulose acetate film.

The results of Examples 1 to 5 are given in Table 1.

As is shown in Table 1, cellulose acetate was dissolved in a mixed solvent containing acetone according to the cooling dissolution method in Examples 1 and 2. However, 45.5 wt. % mixture (Comparison Example 1) was not dissolved. Cellulose acetate used in Examples 1 to 4 was not dissolved in acetone at room temperature (Comparison Examples 2 to 5). Cellulose acetate having the average acetic acid content of 57.0% was dissolved in acetone at room temperature (Comparison Example 5). However, gelation of the obtained dope was not observed at a low temperature, and the formed film had some problems.

In Table 1, the solubility indicates whether cellulose acetate was dissolved in acetone (+) or not (−). The gelation indicates whether the gelation was observed at 0° C. (+) or not (−).

TABLE 1

| Sample No. | Amount of acetone | Another solvent Name | Amount | Solubility | Gellation |
|---|---|---|---|---|---|
| Example 1 | 380 | 1-Butanol | 10 | + | + |
| Example 2 | 380 | t-Butanol | 10 | + | + |
| Example 3 | 370 | 2-Methyl-2-butanol | 10 | + | + |
| Example 4 | 250 | Methyl acetate | 50 | + | + |
| Example 5 | 300 | Cyclohexanone | 50 | + | + |

EXAMPLE 6

At room temperature, 100 weight parts of cellulose acetate (average acetic acid content: 60.9%, viscosity average degree of polymerization: 299) were mixed with 375 weight parts of acetone, 10 weight parts of t-butanol and 15 weight parts of diethyl phthalate (DEP).

The mixture was treated using water/ethylene glycol as the cooling medium (−30° C.) according to the cooling dissolution method in the same manner as in Example 1 to prepare a dope.

The viscosity and the gelation temperature were measured according to the method (7). The viscosity was 240 Pas (25° C.) and the gelation temperature was −12° C.

The dope was cast and dried in the same manner as in Example 1 to prepare a cellulose acetate film.

EXAMPLE 7

At room temperature, 100 weight parts of cellulose acetate (average acetic acid content: 60.9%, viscosity average degree of polymerization: 299) were mixed with 385 weight parts of acetone, 10 weight parts of t-butanol, 15 weight parts of diethyl phthalate (DEP) and 20 weight parts of 2,2'-methylenebis (4,6-di-t-butylphenyl) sodium phosphate (Adecastab NA-11, product of Asahi Denka Co., Ltd.).

The mixture was treated using water/ethylene glycol as the cooling medium (−30° C.) according to the cooling dissolution method in the same manner as in Example 1 to prepare a dope.

The viscosity and the gelation temperature were measured according to the method (7). The viscosity was 100 Pas (25° C.) and the gelation temperature was −8° C.

The dope was cast and dried in the same manner as in Example 1 to prepare a cellulose acetate film.

The results of Examples 6 and 7 are shown in Table 2.

As is shown in Table 2, 2,2'-methylenebis(4,6-di-t-butylphenyl) sodium phosphate (NA-11) has functions of increasing the gelation temperature and decreasing the viscosity of the dope.

TABLE 2

| Sample No. | Composition of dope (wt. part) | | | | | Viscosity Pas (25° C.) | Gel Temp. |
|---|---|---|---|---|---|---|---|
| | CA | (A) | (B) | DEP | NA-11 | | |
| Ex. 6 | 100 | 375 | 10 | 15 | — | 240 | −12° C. |
| Ex. 7 | 100 | 375 | 10 | 15 | 20 | 100 | −8° C. |

(Remark)
CA: Cellulose acetate (average acetic acid content: 60.9%, viscosity average degree of polymerization: 299)
A: Acetone
B: t-Butanol (Evaluation of Film)

The cellulose acetate film prepared in Example 2 was subjected to the testing methods of (8) equilibration water content, (9) tensile test, (10) tear test, (11) folding endurance test, (12) resistance to moist heat, (13) retardation (Re) and (14) haze. The results are shown in Table 3.

As is shown in Table 3, the cellulose acetate film prepared according to the present invention has excellent physical and chemical characteristics.

TABLE 3

| Sample No. | (8) % | (9) kg/mm² | (10) kg | (11) Times | (12) | (13) nm | (14) % |
|---|---|---|---|---|---|---|---|
| Ex. 2 | 1.7 | 300 | 23 | 150 | A | 16 | 2.1 |

EXAMPLE 8

At room temperature, 100 weight parts of cellulose acetate (average acetic acid content: 60.9%, viscosity average degree of polymerization: 299) were mixed with 350 weight parts of acetone and 60 weight parts of methyl acetate.

The mixture was treated using water/ethylene glycol as the cooling medium (−30° C.) according to the cooling dissolution method in the same manner as in Example 1 to prepare a dope.

Figure 2:
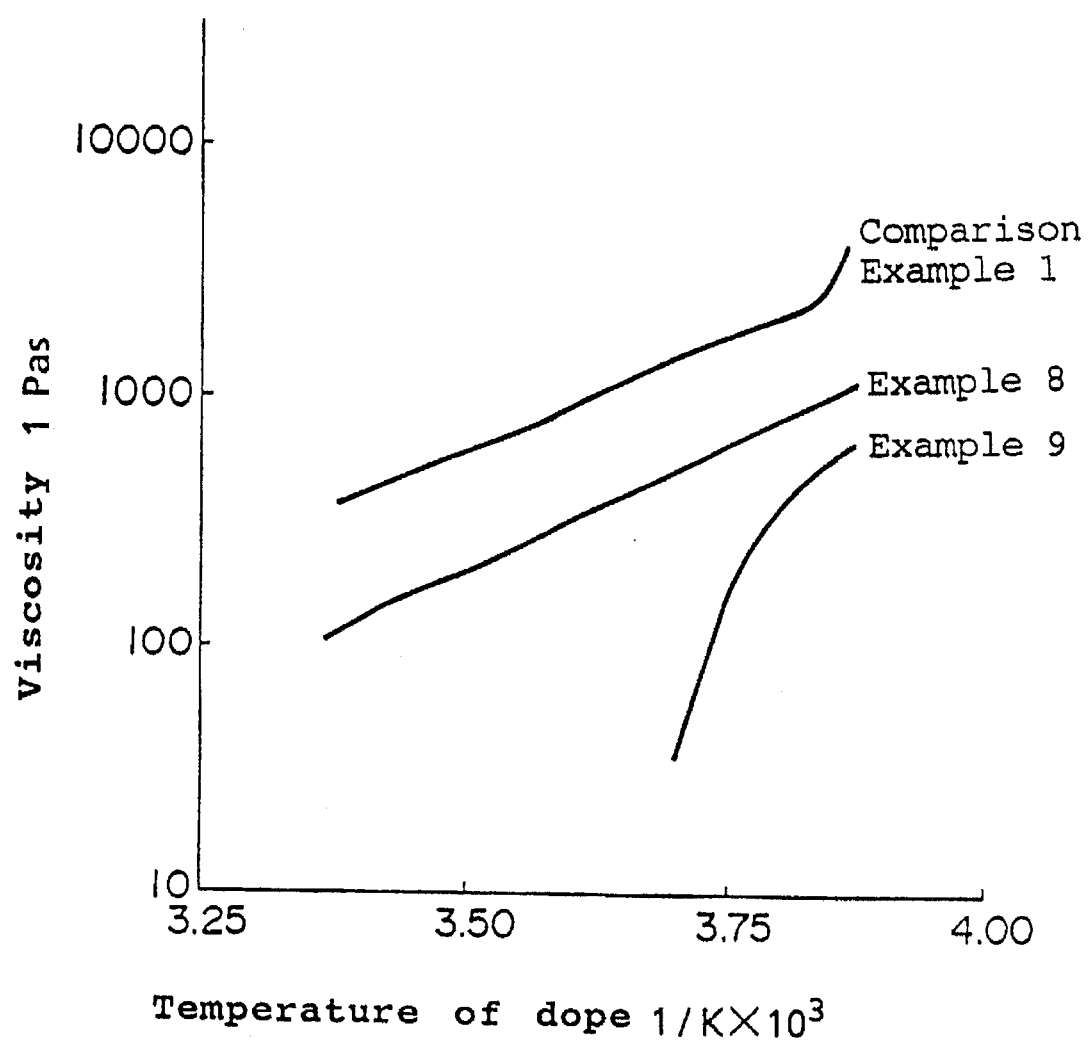
FIG. 2 is a graph showing the relation between the temperature of the dope ($1/K \times 10^3$) and the viscosity of the dope (Log $\eta$).

The viscosity and the gelation temperature were measured according to the method (7). The results are shown in FIG. 2.

EXAMPLE 9

At room temperature, 100 weight parts of cellulose acetate (average acetic acid content: 60.9%, viscosity average degree of polymerization: 299) were mixed with 200 weight parts of acetone and 236 weight parts of methyl acetate.

The mixture was treated using water/ethylene glycol as the cooling medium (−30° C.) according to the cooling dissolution method in the same manner as in Example 1 to prepare a dope.

The viscosity and the gelation temperature were measured according to the method (7). The results are shown in FIG. 2.

COMPARISON EXAMPLE 1

At room temperature, 100 weight parts of cellulose acetate (average acetic acid content: 60.9%, viscosity average degree of polymerization: 299) were mixed with 400 weight parts of acetone.

The mixture was treated using water/ethylene glycol as the cooling medium (−30° C.) according to the cooling dissolution method in the same manner as in Example 1 to prepare a dope.

The viscosity and the gelation temperature were measured according to the method (7). The results are shown in FIG. 2.

FIG. 2 is a graph showing the relation between the temperature of the dope ($1/K \times 10^3$) and the viscosity of the dope ($\text{Log } \eta$) with respect to Examples 8, 9 and Comparison Example 1.

As is shown in FIG. 2, the solvent of the mixture of the present invention can form a dope of low viscosity compared with acetone (Comparison Example 1). The dope of low viscosity can easily be transferred in an apparatus. Further, the low viscosity dope is substantially free from a stringing problem. Therefore, the low viscosity dope is advantageously used in the preparation of a film.

EXAMPLE 10

At room temperature, 100 weight parts of cellulose acetate (average acetic acid content: 60.9%, viscosity average degree of polymerization: 299) was mixed with 380 weight parts of acetone, 10 weight parts of 1-butanol and 15 weight parts of triphenyl phosphate (TPP).

The mixture was treated using water/ethylene glycol as the cooling medium (−30° C.) according to the cooling dissolution method in the same manner as in Example 1 to prepare a dope.

The dope was cast and dried in the same manner as in Example 1 to prepare a cellulose acetate film.

The cellulose acetate film was subjected to the testing methods of (8) equilibration water content, (9) tensile test, (10) tear test, (11) folding endurance test, (12) resistance to moist heat, (13) retardation (Re) and (14) haze.

The results are set forth in Table 4.

As is shown in Table 4, the cellulose acetate film prepared according to the present invention has excellent physical and chemical characteristics.

TABLE 4

| Sample No. | (8) % | (9) kg/mm² | (10) kg | (11) Times | (12) | (13) nm | (14) % |
| --- | --- | --- | --- | --- | --- | --- | --- |
| Ex. 10 | 1.7 | 330 | 18 | 170 | B | 50 | 1.0 |

Further, the results of Example 10 were compared with the results of Example 2 (shown in Table 3). With respect to the resistance to moisture-heat, the film of Example 10 is rather inferior to the film of Example 2. Accordingly, the film of Example 2 is preferably used as an optical film, which requires strong resistance to moisture-heat.

COMPARISON EXAMPLE 3 AND EXAMPLES 11 TO 28

A dope was prepared in the same manner as in Example 1, except that 100 weight parts of cellulose acetate were mixed with an organic solvent set forth in Table 5 and 15 weight parts of diethyl phthalate (DEP, plasticizer).

The stability of the obtained dope was measured according to the testing method (19).

The dope was cast and dried in the same manner as in Example 1 to prepare a cellulose acetate film. The casing bead and the flatness of the film after drying were evaluated according to the testing method (20).

The results are set forth in Table 5. In Table 5, the amount is represented by weight part.

TABLE 5

| Sample No. | Acetone Amount | Another solvent Name | Another solvent Amount | Testing method (19) | Testing method (20) |
| --- | --- | --- | --- | --- | --- |
| Comp. 3 | 385 | None | — | C | B |
| Ex. 11 | 366 | Methanol | 19 | A | A |
| Ex. 12 | 366 | Ethanol | 19 | A | A |
| Ex. 13 | 366 | t-Butanol | 19 | A | A |
| Ex. 14 | 346 | t-Butanol | 39 | A | A |
| Ex. 15 | 308 | t-Butanol | 77 | A | A |
| Ex. 16 | 192 | t-Butanol | 193 | A | A |
| Ex. 17 | 366 | Cyclohexanone | 19 | A | A |
| Ex. 18 | 346 | Cyclohexanone | 39 | A | A |
| Ex. 19 | 308 | Cyclohexanone | 77 | A | A |
| Ex. 20 | 192 | Cyclohexanone | 193 | A | A |
| Ex. 21 | 366 | 1,3-Dioxolane | 19 | A | A |
| Ex. 22 | 346 | 1,3-Dioxolane | 39 | A | A |
| Ex. 23 | 366 | Ethyl formate | 19 | A | A |
| Ex. 24 | 346 | Ethyl formate | 39 | A | A |
| Ex. 25 | 366 | Me Et ketone | 19 | A | A |
| Ex. 26 | 346 | Me Et ketone | 39 | A | A |
| Ex. 27 | 366 | $CH_2Cl_2$ | 19 | A | A |
| Ex. 28 | 346 | $CH_2Cl_2$ | 39 | A | A |

EXAMPLE 29

At room temperature, 100 weight parts of cellulose acetate (average acetic acid content: 60.9%, viscosity average degree of polymerization: 299) were mixed with 470 weight parts of acetone and 85 weight parts of methyl acetate.

The mixture was treated using water/ethylene glycol as the cooling medium (−30° C.) according to the cooling dissolution method in the same manner as in Example 1 to prepare a dope. The dope was cast and dried in the same manner as in Example 1 to prepare a cellulose acetate film having the thickness of 100 μm.

EXAMPLE 30

Cellulose acetate used in Example 29 was stirred in acetone at room temperature for 30 minutes. The amount of acetone was ten times as large as the amount of cellulose acetate. Cellulose acetate was extracted from acetone and dried.

Thus, cellulose acetate (average acetic acid content: 60.9%, viscosity average degree of polymerization: 322) was obtained by removing the low molecular weight fraction. A dope was formed according to the cooling dissolution method in the same manner as in Example 29, except that the obtained cellulose acetate was used and that the amount of cellulose acetate in the mixture was 18.5 wt. %.

Further, a cellulose acetate film was formed from the obtained dope in the same manner as in Example 29.

EXAMPLE 31

According to a conventional method, 100 weight parts of cellulose were esterified and hydrolyzed using 11.7 weight parts of sulfuric acid, 260 weight parts of acetic anhydride and 450 weight parts of acetic acid to prepare cellulose acetate (average acetic acid content: 60.2%, viscosity average degree of polymerization: 313).

Thus, cellulose acetate containing a small amount of a low molecular weight fraction was prepared. A dope was formed according to the cooling dissolution method in the same manner as in Example 29, except that the obtained cellulose acetate was used.

Further, a cellulose acetate film was formed from the obtained dope in the same manner as in Example 29.

EXAMPLE 32

A dope was formed according to the cooling dissolution method in the same manner as in Example 29, except that another cellulose acetate (average acetic acid content: 61.7%, viscosity average degree of polymerization: 291) was used.

Further, a cellulose acetate film was formed from the obtained dope in the same manner as in Example 29.

(Evaluation of Cellulose Acetate)

Cellulose acetates used in Examples 29 to 32 were examined according to the testing methods of (1) acetic acid content, (2) molecular weight distribution (Mw/Mn), (3) viscosity average degree of polymerization (DP), (4) concentrated solution viscosity ($\eta$: second), (5) crystallization exotherm ($\Delta Hc$), (6) ratio of acetone extracted fraction (%), (15) the value of $\ln(\eta)$, (16) the preferred lower limit of $\ln(\eta)$ and (17) the preferred upper limit of $\ln(\eta)$.

The results are set forth in Table 6.

TABLE 6

| Test | Examples | | | |
|---|---|---|---|---|
| No. | 29 | 30 | 31 | 32 |
| (1) % | 60.9 | 60.9 | 60.2 | 61.7 |
| (2) | 2.74 | 1.60 | 1.54 | 2.34 |
| (3) | 299 | 322 | 313 | 291 |
| (4) $\eta$: second | 74.7 | 101.5 | 92.7 | 107.8 |
| (5) J/g | 17.5 | 14.0 | 13.5 | 18.1 |
| (6) % | 12.1 | 0.4 | 0.4 | 12.1 |
| (15) | 4.31 | 4.62 | 4.53 | 4.68 |
| (16) | 4.29 | 4.50 | 4.42 | 4.21 |
| (17) | 4.39 | 4.85 | 4.67 | 4.22 |

The dopes prepared in Examples 29 to 32 were kept in a thermostat at 45° C., and observed. The dopes of Examples 29 and 32 kept the uniform solution for 1 hour. After 5 hours, a phase separation was observed because of precipitation of cellulose acetate. On the other hand, the dopes of Examples 30 and 31 kept the uniform solution for over 240 hours.

EXAMPLE 33

At room temperature, 100 weight parts of cellulose acetate (average acetic acid content: 60.9%, viscosity average degree of polymerization: 299) were mixed with 400 weight parts of methyl acetate. The amount of cellulose acetate in the mixture was 20 wt. %. Cellulose acetate was not dissolved, but was swelled in methyl acetate at room temperature. The swelled mixture was in the form of slurry.

The swelled mixture was placed in a jacketed vessel. The mixture was slowly stirred while pouring a mixture of water and ethylene glycol (cooling medium) into the outer jacket. Thus, the mixture placed in the inner vessel was cooled to −30° C. The mixture was uniformly cooled to complete gelation (30 minutes).

The cooling medium in the outer jacket was removed from the vessel, and warmed water was poured into the jacket. After the mixture was melted to some extent, the mixture was were stirred. Thus, the mixture was warmed to room temperature for 30 minutes.

The obtained dope was observed. Cellulose acetate was completely dissolved in the solvent to obtain a uniform dope.

Gelation of the dope was determined by the method (7). As a result, gelation was observed at a low temperature.

The cooling and warming steps were repeated again.

The dope was cast on a band using a band casting machine (effective length: 6 m). The dry thickness of the formed film was 100 μm. The temperature of the band was 0° C. The film was dried with air for 2 seconds, and peeled off the band. The film was further slowly dried at 100° C. for 3 minutes, at 130° C. for 5 minutes, and at 160° C. for 5 minutes to evaporate the remaining solvent, while fixing the end of the film. Thus a cellulose acetate film was prepared.

EXAMPLE 34

A swelled mixture was prepared in the same manner as in Example 33, except that 100 weight parts of cellulose acetate were mixed with 400 weight parts of ethyl formate. The swelled mixture was in the form of slurry.

The swelled mixture was treated according to the cooling dissolution method in the same manner as in Example 33 to prepare a dope.

The obtained dope was observed. Cellulose acetate was completely dissolved in the solvent to obtain a uniform dope. Further, gelation was observed at a low temperature.

The dope was cast and dried in the same manner as in Example 33 to prepare a cellulose acetate film.

EXAMPLE 35

A swelled mixture was prepared in the same manner as in Example 33, except that 100 weight parts of cellulose acetate were mixed with 400 weight parts of cyclohexanone. The swelled mixture was in the form of slurry.

The swelled mixture was treated according to the cooling dissolution method in the same manner as in Example 33 to prepare a dope.

The obtained dope was observed. Cellulose acetate was completely dissolved in the solvent to obtain a uniform dope. Further, 9elation was observed at a low temperature.

The dope was cast and dried in the same manner as in Example 33 to prepare a cellulose acetate film.

EXAMPLE 36

At room temperature, 100 weight parts of cellulose acetate (average acetic acid content: 60.9%, viscosity average degree of polymerization: 299) were mixed with 400 weight parts of 1,3-dioxolane. The amount of cellulose acetate in the mixture was 20 wt. %.

The mixture was stirred for 4 hours at room temperature. As a result, cellulose acetate was completely dissolved in 1,3-dioxolane.

Separately, the mixture (in which cellulose acetate was partially dissolved) was treated according to the cooing dissolution method in the same manner as in Example 33 to prepare a dope.

The obtained dope was observed. Cellulose acetate was completely dissolved in the solvent to give a uniform dope. Further, gelation was observed at a low temperature.

According to the cooling dissolution method, cellulose acetate was completely dissolved in the solvent for a short time (1 hour), compared with a conventional process of stirring the mixture at room temperature.

The dope was cast and dried in the same manner as in Example 33 to prepare a cellulose acetate film.

EXAMPLE 37

At room temperature, 100 weight parts of cellulose acetate (average acetic acid content: 60.9%, viscosity average degree of polymerization: 299) were mixed with 400 weight parts of 1,4-dioxane. The amount of cellulose acetate in the mixture was 20 wt. %.

The mixture was stirred for 5 hours at room temperature. As a result, cellulose acetate was completely dissolved in 1,3-dioxolane.

Separately, the mixture (in which cellulose acetate was partially dissolved) was treated according to the cooing dissolution method in the same manner as in Example 33 to prepare a dope.

The obtained dope was observed. Cellulose acetate was completely dissolved in the solvent to give a uniform dope. Further, gelation was observed at a low temperature.

According to the cooling dissolution method, cellulose acetate was completely dissolved in the solvent for a short time (1 hour), compared with a conventional process of stirring the mixture at room temperature.

The dope was cast and dried in the same manner as in Example 33 to prepare a cellulose acetate film.

COMPARISON EXAMPLES 3 TO 8

At room temperature, 100 weight parts of cellulose acetate (average acetic acid content: 60.9%, viscosity average degree of polymerization: 299) were mixed with 400 weight parts of an alcohol set forth in Table 7. The amount of cellulose acetate in the mixture was 20 wt. %. Cellulose acetate was not dissolved and scarcely swelled in the alcohol.

The mixture was treated according to the cooing dissolution method in the same manner as in Example 33. As a result, cellulose acetate was still not dissolved and scarcely swelled in the alcohol.

The results of Examples 33 to 37 and Comparison Examples 3 to 8 are shown in Table 7.

TABLE 7

| Sample No. | Organic solvent | | | Solubility | |
|---|---|---|---|---|---|
| | Name | b.p. | MPa$^{1/2}$ | (R) | (C) |
| Ex. 33 | Methyl acetate | 57.8° C. | 19.6 | ± | + |
| Ex. 34 | Ethyl formate | 54.2° C. | 19.4 | ± | + |
| Ex. 35 | Cyclohexanone | 155.7° C. | 19.7 | ± | + |
| Ex. 36 | 1,3-Dioxolane | 74.5° C. | 22.6 | + | + |
| Ex. 37 | 1,4-Dioxane | 101.3° C. | 20.5 | + | + |
| Comp. 3 | Cyclohexanol | 161.0° C. | 20.8 | − | − |
| Comp. 4 | 2-Methyl-2-butanol | 101.8° C. | 19.0 | − | − |
| Comp. 5 | t-Butanol | 82.5° C. | 20.7 | − | − |
| Comp. 6 | 1-Butanol | 117.7° C. | 23.4 | − | − |
| Comp. 7 | Ethanol | 78.3° C. | 25.8 | − | − |
| Comp. 8 | Methanol | 64.5° C. | 29.5 | − | − |

(Remark)
R: The mixture was stirred at room temperature.
C: The mixture was treated according to the cooling dissolution method.
−: Cellulose acetate was neither dissolved nor swelled.
±: Cellulose acetate was swelled, but not dissolved.
+: Cellulose acetate was dissolved.

EXAMPLE 38

A dope was prepared in the same manner as in Example 33, except that 100 weight parts of cellulose acetate (average acetic acid content: 60.9%, viscosity average degree of polymerization: 299) were mixed with 350 weight parts of methyl acetate.

The obtained dope was observed. Cellulose acetate was completely dissolved in the solvent to give a uniform dope. Further, gelation of the dope was observed at a low temperature.

The dope was cast and dried in the same manner as in Example 33 to prepare a cellulose acetate film.

EXAMPLE 39

A dope was prepared in the same manner as in Example 33, except that 100 weight parts of cellulose acetate (average acetic acid content: 60.9%, viscosity average degree of polymerization: 299) were mixed with 400 weight parts of cyclohexanone and that the mixture was cooled to −70° C.

The obtained dope was observed. Cellulose acetate was completely dissolved in the solvent to give a uniform dope. Further, gelation of the dope was observed at a low temperature.

The dope was cast and dried in the same manner as in Example 33 to prepare a cellulose acetate film.

EXAMPLE 40

A dope was prepared in the same manner as in Example 33, except that 100 weight parts of cellulose acetate (average acetic acid content: 60.9%, viscosity average degree of polymerization: 299) were mixed with 400 weight parts of ethyl formate and that the mixture was cooled to −70° C. using a mixture of dry ice and methanol as the cooling medium.

The obtained dope was observed. Cellulose acetate was completely dissolved in the solvent to give a uniform dope. Further, gelation of the dope was observed at a low temperature.

The dope was cast and dried in the same manner as in Example 33 to prepare a cellulose acetate film.

The results of Examples 38 to 40 are shown in Table 8.

TABLE 8

| Sample | Organic solvent | | | Solubility | Gelation |
|---|---|---|---|---|---|
| No. | Name | Amount | Temp. | | |
| Ex. 38 | Methyl acetate | 350 | −30° C. | + | + |
| Ex. 39 | Cyclohexanone | 400 | −70° C. | + | + |
| Ex. 40 | Ethyl formate | 400 | −70° C. | + | + |

EXAMPLE 41

A dope was prepared in the same manner as in Example 33, except that other cellulose acetate (average acetic acid content: 60.2%, viscosity average degree of polymerization: 323) was used.

The obtained dope was observed. Cellulose acetate was completely dissolved in the solvent to give a uniform dope. Further, gelation of the dope was observed at a low temperature.

The dope was cast and dried in the same manner as in Example 33 to prepare a cellulose acetate film.

EXAMPLE 42

A dope was prepared in the same manner as in Example 33, except that other cellulose acetate (average acetic acid content: 59.5%, viscosity average degree of polymerization: 395) was used and that the mixture was cooled to −20° C.

The obtained dope was observed. Cellulose acetate was completely dissolved in the solvent to give a uniform dope. Further, gelation of the dope was observed at a low temperature.

The dope was cast and dried in the same manner as in Example 33 to prepare a cellulose acetate film. The results of Examples 41 and 42 are set forth in Table 9.

TABLE 9

| Sample | Cellulose Ac | | Organic solvent | Temp. | Gelation |
|---|---|---|---|---|---|
| No. | (A) | (P) | | | |
| Ex. 9 | 60.2 | 323 | Methyl acetate | −30° C. | + |
| Ex. 10 | 59.5 | 395 | Methyl acetate | −20° C. | + |

(Remark)
A: Acetic acid content
P: Degree of polymerization

COMPARISON EXAMPLE 9

At room temperature (20° C.), 100 weight parts of cellulose acetate (average acetic acid content: 60.9%, viscosity average degree of polymerization: 299) were mixed with 400 weight parts of methyl acetate. The swelled mixture was in the form of slurry.

The swelled mixture was placed in a jacketed vessel used in Example 33. The mixture was slowly stirred while pouring water at room temperature (20° C.). The mixture in the inner vessel was stirred for 30 minutes. The swelled mixture was not dissolved, and was still in the form of slurry. The stirring process for 30 minutes was repeated for three times. However, the swelled mixture was not dissolved, and was still in the form of slurry.

COMPARISON EXAMPLE 10

The procedures in Comparison Example 9 were repeated, except that other cellulose acetate (average acetic acid content: 57.0%, viscosity average degree of polymerization: 280) was used. As a result, cellulose acetate was dissolved in methyl acetate at room temperature.

Gelation of the obtained dope was determined by the method (7). As a result, gelation was not observed at a low temperature.

The dope was cast on a band in the same manner as in Example 33. The film was peeled from the band after the film was completely dried because the dope was not set at the low temperature (0° C.). Further, the film was shrunk only in the direction of the thickness because the film was placed on the band while drying the film. Accordingly, obtained film was rather stretched in the plane directions. The mechanical strength of the film was insufficient, and the film was easily torn.

The results of Comparison Examples 9 and 10 are shown in Table 10.

TABLE 10

| Sample | Cellulose Ac | | Organic solvent | Temp. | Solubility |
|---|---|---|---|---|---|
| No. | (A) | (P) | | | |
| Comp. 9 | 60.9 | 299 | Methyl acetate | 20° C. | − |
| Comp. 10 | 57.0 | 280 | Methyl acetate | 20° C. | + |

(Remark)
A: Acetic acid content
P: Degree of polymerization

EXAMPLE 43

At room temperature, 100 weight parts of cellulose acetate (average acetic acid content: 60.9%, viscosity average degree of polymerization: 299) were mixed with 525 weight parts of methyl acetate and 15 weight parts of diethyl phthalate (DEP).

The mixture was treated using water/ethylene glycol as the cooling medium (−30° C.) according to the cooling dissolution method in the same manner as in Example 33 to prepare a dope.

The viscosity and the gelation temperature were measured according to the method (7). The viscosity was 90 Pas (40° C.) and the gelation temperature was 11° C.

The dope was cast and dried in the same manner as in Example 33 to prepare a cellulose acetate film.

EXAMPLE 44

At room temperature, 100 weight parts of cellulose acetate (average acetic acid content: 60.9%, viscosity average degree of polymerization: 299) were mixed with 525 weight parts of methyl acetate, 15 weight parts of diethyl phthalate (DEP) and 20 weight parts of 2,2'-methylenebis-(4,6-di-t-butylphenyl) sodium phosphate (Adecastab NA-11, product of Asahi Denka Co., Ltd.).

The mixture was treated using water/ethylene glycol as the cooling medium (−30° C.) according to the cooling dissolution method in the same manner as in Example 33 to prepare a dope.

The viscosity and the gelation temperature were measured according to the method (7). The viscosity was 80 Pas (40° C.) and the gelation temperature was 15° C.

The dope was cast and dried in the same manner as in Example 33 to prepare a cellulose acetate film.

The results of Examples 43 and 44 are set forth in Table 11.

As is shown in Table 11, 2,2'-methylenebis(4,6-di-t-butylphenyl) sodium phosphate (NA-11) has functions of increasing the gelation temperature and decreasing the viscosity of the dope.

TABLE 11

| Sample | Composition of dope (wt. part) | | | | Viscosity | Gel. |
|---|---|---|---|---|---|---|
| No. | CA | MeAc | DEP | NA-11 | Pas (25° C.) | Temp. |
| Ex. 43 | 100 | 525 | 15 | — | 90 | 11° C. |
| Ex. 44 | 100 | 525 | 15 | 0.4 | 80 | 15° C. |

(Remark)
CA: Cellulose acetate (average acetic acid content: 60.9%, viscosity average degree of polymerization: 299)
MeAc: Methyl acetate

EXAMPLE 45

At room temperature, 100 weight parts of cellulose acetate (average acetic acid content: 60.2%, viscosity average degree of polymerization: 323) were mixed with 470 weight parts of methyl acetate and 15 weight parts of diethyl phthalate (DEP).

The mixture was treated using a mixture of dry ice and methanol as the cooling medium (−70° C.) according to the cooling dissolution method in the same manner as in Example 40 to prepare a dope. The dope had a sufficient stability.

The dope was cast and dried in the same manner as in Example 33 to prepare a cellulose acetate film. The film on the support was dried for 60 seconds or more to peel the film from the support.

EXAMPLE 46

At room temperature, 100 weight parts of cellulose acetate (average acetic acid content: 60.2%, viscosity average degree of polymerization: 323) were mixed with 400 weight parts of methyl acetate, 70 weight parts of ethanol and 15 weight parts of diethyl phthalate (DEP).

The mixture was treated using a mixture of dry ice and methanol as the cooling medium (−70° C.) according to the cooling dissolution method in the same manner as in Example 40 to prepare a dope. The dope had a sufficient stability.

The dope was cast and dried in the same manner as in Example 33 to prepare a cellulose acetate film. The film on the support was dried for 60 seconds or longer to peel the film from the support.

EXAMPLE 47

At room temperature, 100 weight parts of cellulose acetate (average acetic acid content: 60.2%, viscosity average degree of polymerization: 323) were mixed with 375 weight parts of methyl acetate, 95 weight parts of ethanol and 15 weight parts of diethyl phthalate (DEP).

The mixture was treated using a mixture of dry ice and methanol as the cooling medium (−70° C.) according to the cooling dissolution method in the same manner as in Example 40 to prepare a dope. The dope had a sufficient stability.

The dope was cast and dried in the same manner as in Example 33 to prepare a cellulose acetate film. The film on the support was dried for 20 seconds or shorter to peel the film from the support.

COMPARISON EXAMPLE 11

At room temperature, 100 weight parts of cellulose acetate (average acetic acid content: 60.2%, viscosity average degree of polymerization: 323) were mixed with 470 weight parts of acetone, 70 weight parts of ethanol and 15 weight parts of diethyl phthalate (DEP).

The mixture was treated using a mixture of dry ice and methanol as the cooling medium (−70° C.) according to the cooling dissolution method in the same manner as in Example 40 to prepare a dope. The dope was rather stable, but the stability was inferior to those of Examples 45 to 47.

The dope was cast and dried in the same manner as in Example 33 to prepare a cellulose acetate film. The film on the support was dried for 60 seconds or longer to peel the film from the support.

The results of Examples 45 to 47 and Comparison Example 11 are shown in Table 12.

TABLE 12

| Sample | Organic solvent | | Testing method | |
|---|---|---|---|---|
| No. | Name | Amount | (18) | (19) |
| Ex. 45 | Methyl acetate | 470 | A | B |
| Ex. 46 | Methyl acetate/ethanol | 400/70 | A | B |
| Ex. 47 | Methyl acetate/ethanol | 375/95 | A | A |
| Comp. 11 | Acetone | 470 | B | B |

(Evaluation of Film)

The cellulose acetate films prepared in Examples 43 and 44 were subjected to the testing methods of (8) equilibration water content, (9) tensile test, (10) tear test, (11) folding endurance test, (12) resistance to moist heat, (13) retardation (Re), and (14) haze.

The results are set forth in Table 13.

As is shown in Table 13, the cellulose acetate films prepared according to the present invention have excellent physical and chemical characteristics.

TABLE 13

| Sample No. | (8) % | (9) kg/mm$^2$ | (10) kg | (11) Times | (12) | (13) nm | (14) % |
|---|---|---|---|---|---|---|---|
| Ex. 43 | 1.7 | 295 | 25 | 146 | A | 2 | 0.4 |
| Ex. 44 | 1.7 | 305 | 24 | 152 | A | 3 | 0.3 |

EXAMPLE 48

A dope was prepared according to the cooling dissolution method in the same manner as in Example 33, except that the amount of cellulose acetate in the mixture was 18.5 wt. %. The dope was cast and dried in the same manner as in Example 33 to prepare a cellulose acetate film having the thickness of 100 μm.

EXAMPLE 49

Cellulose acetate used in Example 33 was stirred in acetone at room temperature for 30 minutes. The amount of acetone was ten times as large as the amount of cellulose acetate. Cellulose acetate was extracted from acetone and dried.

Thus, cellulose acetate (average acetic acid content: 60.9%, viscosity average degree of polymerization: 322) was obtained by removing the low molecular weight fraction. A dope was formed according to the cooling dissolution method in the same manner as in Example 33, except that the obtained cellulose acetate was used and that the ratio of cellulose acetate in the mixture was 18.5 wt. %.

Further, a cellulose acetate film was formed from the obtained dope in the same manner as in Example 33.

EXAMPLE 50

According to a conventional method, 100 weight parts of cellulose were esterified and hydrolyzed by using 11.7 weight parts of sulfuric acid, 260 weight parts of acetic anhydride and 450 weight parts of acetic acid to produce cellulose acetate (average acetic acid content: 60.2%, viscosity average degree of polymerization: 313).

Thus, cellulose acetate containing a small amount of a low molecular weight fraction was produced. A dope was formed according to the cooling dissolution method in the same manner as in Example 33, except that the obtained cellulose acetate was used and that the ratio of cellulose acetate in the mixture was 18.5 wt. %.

Further, a cellulose acetate film was formed from the obtained dope in the same manner as in Example 33.

EXAMPLE 51

A dope was formed according to the cooling dissolution method in the same manner as in Example 33, except that another cellulose acetate (average acetic acid content: 61.7%, viscosity average degree of polymerization: 291) was used and that the ratio of cellulose acetate in the mixture was 18.5 wt. %.

Further, a cellulose acetate film was formed from the obtained dope in the same manner as in Example 33.

EXAMPLE 52

A dope was prepared in the same manner as in Example 48, except that a mixture of methyl acetate and ethanol (ratio: 87/13) was used in place of methyl acetate and that the ratio of cellulose acetate in the mixture was 17.5 wt. %. The dope was cast and dried in the same manner as in Example 48 to prepare a cellulose acetate film having the thickness of 100 μm.

EXAMPLE 53

A dope was prepared in the same manner as in Example 49, except that a mixture of methyl acetate and ethanol (ratio: 87/13) was used in place of methyl acetate and that the ratio of cellulose acetate in the mixture was 17.5 wt. %. The dope was cast and dried in the same manner as in Example 49 to prepare a cellulose acetate film having the thickness of 100 μm.

(Evaluation of Cellulose Acetate)

Cellulose acetates used in Examples 48 (and 52), 49 (and 53), 50 and 51 were examined according to the testing methods of (1) acetic acid content, (2) molecular weight distribution (Mw/Mn), (3) viscosity average degree of polymerization (DP), (4) concentrated solution viscosity (η: second), (5) crystallization exotherm (ΔHc), (6) ratio of acetone extracted fraction (%), (15) the value of ln(η), (16) the preferred lower limit of ln(η), and (17) the preferred upper limit of ln(η).

The results are set forth in Table 14.

TABLE 14

| Test No. | | Examples | | | |
|---|---|---|---|---|---|
| | | 48 & 52 | 49 & 53 | 50 | 51 |
| (1) | % | 60.9 | 60.9 | 60.2 | 61.7 |
| (2) | | 2.74 | 1.60 | 1.54 | 2.34 |
| (3) | | 299 | 322 | 313 | 291 |
| (4) | η: second | 74.7 | 101.5 | 92.7 | 107.8 |
| (5) | J/g | 17.5 | 14.0 | 13.5 | 18.1 |
| (6) | % | 12.1 | 0.4 | 0.4 | 12.1 |
| (15) | | 4.31 | 4.62 | 4.53 | 4.68 |
| (16) | | 4.29 | 4.50 | 4.42 | 4.21 |
| (17) | | 4.39 | 4.85 | 4.67 | 4.22 |

The dopes prepared in Examples 48, 49, 52 and 53 were kept in a thermostat at 45° C., and observed. The dopes of Examples 48 and 52 kept the uniform solution for 1 hour. After 5 hours, a phase separation was observed because of precipitation of cellulose acetate. On the other hand, the dopes of Examples 49 and 53 kept the uniform solution for over 240 hours.

(Evaluation of Film)

The cellulose acetate films prepared in Examples 48 to 50 were subjected to the testing methods of (9a) modulus of elasticity at the tensile test, (9b) breaking extension at the tensile test, (10) tear test, (11) folding endurance test, (13) retardation (Re), and (14) haze.

The results are set forth in Table 15.

TABLE 15

| Sample No. | (9a) Kg/mm$^2$ | (9b) kg | (10) g/f | (11) times | (13) nm | (14) |
|---|---|---|---|---|---|---|
| Ex. 50 | 254/232 | 35/38 | 18.7/18.5 | 120/140 | 3 | 0.3 |
| Ex. 51 | 228/219 | 27/31 | 16.5/26.1 | 157/168 | 3 | 0.4 |
| Ex. 52 | 253/249 | 33/37 | 17.7/18.0 | 132/124 | 3 | 0.3 |

(Remarks)
254/232: Value in the casting direction/value in the direction perpendicular to the casting direction

EXAMPLE 54

At room temperature, 100 weight parts of cellulose acetate (average acetic acid content: 60.9%, viscosity average degree of polymerization: 299) was mixed with 385 weight parts of methyl acetate and 15 weight parts of triphenyl phosphate (TPP).

The mixture was treated using water/ethylene glycol as the cooling medium (−30° C.) according to the cooling dissolution method in the same manner as in Example 33 to prepare a dope.

The dope was cast and dried in the same manner as in Example 33 to prepare a cellulose acetate film.

The cellulose acetate film was subjected to the testing methods of (8) equilibration water content, (9) tensile test, (10) tear test, (11) folding endurance test, (12) resistance to moist heat, (13) retardation (Re), and (14) haze.

The results are set forth in Table 16.

As is shown in Table 16, the cellulose acetate film prepared according to the present invention has excellent physical and chemical characteristics.

TABLE 16

| Sample No. | (8) % | (9) kg/mm² | (10) kg | (11) Times | (12) | (13) nm | (14) % |
|---|---|---|---|---|---|---|---|
| Ex. 54 | 1.6 | 310 | 17 | 160 | B | 40 | 1.4 |

Further, the results of Example 54 were compared with the results of Examples 43 and 44 (shown in Table 13). With respect to the resistance to moisture-heat, the film of Example 10 is rather inferior to the films of Examples 43 and 44. Accordingly, the films of Examples 43 and 44 are preferably used as optical films, which require strong resistance to moisture-heat.

As is described above, a stable cellulose acetate solution can be obtained by the present invention. Further, an excellent cellulose acetate film can also be prepared according to the present invention.

We claim:

1. A cellulose acetate solution which comprises cellulose acetate having an average acetic acid content in the range of 58.0 to 62.5% in a solvent, wherein the solvent is a mixture of acetone and an organic solvent which is selected from the group consisting of an ether having 3 to 12 carbon atoms, a ketone having 4 to 12 carbon atom, an ester having 3 to 12 carbon atoms and an alcohol having 1 to 6 carbon atoms.

2. The cellulose acetate solution as claimed in claim 1, wherein the solution has a concentration of the cellulose acetate in the range of 10 to 40 wt. %.

3. The cellulose acetate solution as claimed in claim 1, wherein the amount of acetone in the mixture of acetone and the organic solvent is 10 to 99.5 wt. %.

4. The cellulose acetate solution as claimed in claim 1, wherein the cellulose acetate has a viscosity average degree of polymerization in the range of 250 to 400.

5. The cellulose acetate solution as claimed in claim 1, wherein a plasticizer is further dissolved in the solution in an amount of 0.1 to 20 weight parts based on 100 weight parts of the cellulose acetate.

6. A process for the preparation of a cellulose acetate solution which comprises the steps of:

cooling a mixture of cellulose acetate and a solvent to a temperature of −100° to −10° C., said cellulose acetate having an average acetic acid content in the range of 58.0 to 62.5%, and said solvent being a mixture of acetone and an organic solvent which is selected from the group consisting of an ether having 3 to 12 carbon atoms, a ketone having 4 to 12 carbon atom, an ester having 3 to 12 carbon atoms and an alcohol having 1 to 6 carbon atoms; and warming the cooled mixture to a temperature of 0° to 50° C. to dissolve the cellulose acetate in the solvent.

7. A process for the preparation of a cellulose acetate film which comprises the steps of:

cooling a mixture of cellulose acetate and a solvent to a temperature of −100° to −10° C., said cellulose acetate having an average acetic acid content in the range of 58.0 to 62.5%, and said solvent being a mixture of acetone and an organic solvent which is selected from the group consisting of an ether having 3 to 12 carbon atoms, a ketone having 4 to 12 carbon atom, an ester having 3 to 12 carbon atoms and an alcohol having 1 to 6 carbon atoms;

warming the cooled mixture to a temperature of 0° to 50° C. to dissolve the cellulose acetate in the solvent;

casting the obtained solution on a support; and evaporating the solvent to form the cellulose acetate film.

8. The process as claimed in claim 7, wherein the support on which the solution is cast has a surface temperature of not higher than 10° C.

9. A cellulose acetate solution which comprises cellulose acetate having an average acetic acid content in the range of 58.0 to 62.5% in a solvent, wherein the solvent is selected from the group consisting of an ether having 3 to 12 carbon atoms, a ketone having 4 to 12 carbon atom and an ester having 3 to 12 carbon atoms.

10. The cellulose acetate solution as claimed in claim 9, wherein the solvent is selected from the group consisting of 2-methoxyethyl acetate, cyclohexanone, ethyl formate and methyl acetate.

11. The cellulose acetate solution as claimed in claim 9, wherein the solution has a concentration of the cellulose acetate in the range of 10 to 40 wt. %.

12. The cellulose acetate solution as claimed in claim 9, wherein the solvent further contains an alcohol having 1 to 6 carbon atoms.

13. The cellulose acetate solution as claimed in claim 9, wherein the cellulose acetate has a viscosity average degree of polymerization in the range of 250 to 400.

14. The cellulose acetate solution as claimed in claim 9, wherein a plasticizer is further dissolved in the solution in an amount of 0.1 to 20 weight parts based on 100 weight parts of the cellulose acetate.

15. A process for the preparation of a cellulose acetate solution which comprises the steps of:

cooling a mixture of cellulose acetate and a solvent to a temperature of −100° to −10° C., said cellulose acetate having an average acetic acid content in the range of 58.0 to 62.5%, and said solvent being selected from the group consisting of an ether having 3 to 12 carbon atoms, a ketone having 4 to 12 carbon atom and an ester having 3 to 12 carbon atoms; and warming the cooled mixture to a temperature of 0° to 50° C. to dissolve the cellulose acetate in the solvent.

16. A process for the preparation of a cellulose acetate film which comprises the steps of:

cooling a mixture of cellulose acetate and a solvent to a temperature of −100° to −10° C., said cellulose acetate having an average acetic acid content in the range of 58.0 to 62.5%, and said solvent being selected from the group consisting of an ether having 3 to 12 carbon atoms, a ketone having 4 to 12 carbon atom and an ester having 3 to 12 carbon atoms;

warming the cooled mixture to a temperature of 0° to 50° C. to dissolve the cellulose acetate in the solvent;

casting the obtained solution on a support; and evaporating the solvent to form the cellulose acetate film.

17. The process as claimed in claim 16, wherein the support on which the solution is cast has a surface temperature of not higher than 10° C.

* * * * *